United States Patent
Zhang (10) Patent No.: US 10,692,006 B1
(45) Date of Patent: Jun. 23, 2020

(54) CROWDSOURCED CHATBOT ANSWERS

(71) Applicant: Facebook, Inc., Menlo Park, CA (US)

(72) Inventor: Ying Zhang, Turlock, CA (US)

(73) Assignee: FACEBOOK, INC., Menlo Park, CA (US)

( * ) Notice: Subject to any disclaimer, the term of this patent is extended or adjusted under 35 U.S.C. 154(b) by 939 days.

(21) Appl. No.: 15/199,904

(22) Filed: Jun. 30, 2016

(51) Int. Cl.
*G06N 5/02* (2006.01)
*G06N 20/00* (2019.01)

(52) U.S. Cl.
CPC ............ *G06N 5/022* (2013.01); *G06N 20/00* (2019.01)

(58) Field of Classification Search
CPC ............................... G06N 5/022; G06N 20/00
See application file for complete search history.

(56) References Cited

U.S. PATENT DOCUMENTS

| | | | | |
|---|---|---|---|---|
| 5,933,818 A | * | 8/1999 | Kasravi | G06K 9/622 706/12 |
| 9,582,757 B1 | * | 2/2017 | Holmes | G06N 5/04 |
| 2009/0248665 A1 | * | 10/2009 | Garg | G06F 16/90324 |
| 2012/0095977 A1 | * | 4/2012 | Levin | G06F 16/9535 707/706 |
| 2014/0019394 A1 | * | 1/2014 | Laxminarayan | G06Q 10/101 706/45 |
| 2014/0297571 A1 | * | 10/2014 | Beamon | G06N 20/00 706/12 |
| 2017/0228372 A1 | * | 8/2017 | Moreno | G06F 16/24522 |

OTHER PUBLICATIONS

Chang et al., "Routing Questions for Collaborative Answering in Community Question Answering", Aug. 25-28, 2013, 2013 IEEE/ACM International Conference on Advances in Social Networks Analysis and Mining, pp. 1-8 (Year: 2013).*
Ning et al., "Using Graph Analysis Approach to Support Question & Answer on Enterprise Social Network", Dec. 6-8, 2012, 2012 IEEE Asia-Pacific Services Computing Conference, pp. 146-153 (Year: 2012).*
Yang et al., "CQArank: jointly model topics and expertise in community question answering", Nov. 1, 2013, CIKM '13 Proceedings of the 22nd ACM international conference on Information & Knowledge Management, pp. 1-12 (Year: 2013).*

* cited by examiner

*Primary Examiner* — Alan Chen
*Assistant Examiner* — Brent Johnston Hoover (57) ABSTRACT

A chatbot can use a knowledge base including question/answer pairs to respond to questions. When a question is asked that does not correspond to a question/answer pair in the knowledge base, the chatbot can send the question to one or more humans to obtain an answer. However, only some people will have the experience, context, knowledge, etc., to answer the question. A model can be trained to select "experts" that are likely to be able to provide a good answer to a question by using both A) a vector comprising characteristics of questions and of the person posing the questions and B) a vector comprising characteristics of a possible expert. The model can trained to produce a value predicting how good an identified expert's answer is likely to be. The model can be trained based on measures of past answers provided for types of questions/questioners.

20 Claims, 6 Drawing Sheets

CROWDSOURCED CHATBOT ANSWERS

BACKGROUND

People have come to rely on Internet applications to retrieve all manner of information. Getting driving directions, finding oatmeal cookie recipes, or discovering the best sushi restaurant in town have all become only a couple keystrokes away. As the Internet becomes integrated into almost every aspect of people's lives, the amount of content available to users is growing at an exponential rate. It is common for web providers to operate databases with petabytes of data, while leading content providers are already looking toward technology to handle exabyte implementations. One social networking website, for example, has attracted over a billion users who produce over 25 billion posts, likes, messages, etc., each day. This sheer volume of information can make it difficult to locate the information a user desires.

A variety of technologies have been created in an attempt to address this problem. For example, directories have been published to organize links to various webpages by data type. As the Internet evolved beyond the ability to manually maintain such directories, various search engines were established. While search engines remain one of the primary methods used to locate data, referral and review services have been created to help people find more relevant information. However, it remains difficult to determine which reviews to trust.

Digital personal assistants are another technology that has been created to help people find and use information. From talking paper clips, to virtual conversation systems, to a voice coming from a mobile device that can learn and use updated information, a variety of such digital assistant technologies have been created for different situations and with different capabilities. Some of these technologies use a variety of training data to create it. However, it can be a challenge to identify and use this training data effectively.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments for answering user questions using a knowledge base or querying experts are described. A "chatbot" system can include an interface to receive user questions and a knowledge base with questions mapped to one or more answers, where the knowledge base can be used to look up known answers to user questions. When a sufficiently similar question is not mapped to an answer in the knowledge base, the chatbot system can pose the question to one or more experts determined likely to provide a good answer to the asked question. In some implementations, questions received by a chatbot system can be in conjunction with a social media website. In some implementations where the chatbot system is implemented in conjunction with a social media system, the chatbot system can select one or more of the social media users as potential experts to answer a question.

When the chatbot system selects experts to answer a question, an initial group of potential experts can be selected based on an analysis of the question, such as a determination of a category of the question, a location associated with the question, a subject of the question, etc. This initial selection can also be based on an analysis of the user that asked the question, such as where they live or a determination of where the user currently is, the user's age, gender, educational status, job, likes, dislikes, what type of content they share, a type or classification associated with the user, etc. For example, if a question is "what dentist should I see?" the question can be analyzed to classify it as being about a dentist and asking for a recommendation. In addition, the asker can be analyzed to determine that they live in San Francisco. Based on this analysis, potential experts can be selected that have an association with dentistry or are known to have previously reviewed dentists and that live near San Francisco.

The chatbot system can select a subset of the potential experts to pose the question to. To do this, the chatbot system can use a question source model to create a representation of the question and question asker. The chatbot system can also use an expert model to create a representation of each of the potential experts. The chatbot system can then iteratively apply a distance model to the representation of the question and question asker to one of the representations the potential experts to determine how well each potential expert is expected to answer the question. The results provided by the distance model can be used to select one or more of the potential experts to pose the user's question to.

One or more of the answers provided by the selected experts can be scored and provided to the asking user. In addition, one or more of the answers provided by the experts can be mapped to the question in the knowledge base so that if a similar question is asked again, one of the stored answers can be provided without having to query experts.

In some implementations, the question source model can be a system that enters features of the question in a question sparse vector. In some implementations, the question source model can also enter features of the asker of the question in the question sparse vector. In some implementations, this question sparse vector can be used as the first input to the distance model. In some implementations, the question source model can transform the question sparse vector into a lower dimension question "embedding" which can be used as the first input to the distance model.

An "embedding," as used herein, is a vector in a vector space that has fewer dimensions than a number of selected characteristics. For example, where a potential expert is selected and fourteen characteristics of that potential expert are identified, these fourteen characteristics can be mapped to a vector in a five dimensional vector space. As another example, where a question is provided for which twelve characteristics are selected and a another eight characteristics of the user who asked the question are selected, these twenty characteristics can be mapped to a vector in an eight dimensional vector space. In some implementations, embeddings can be generated using a model trained to map characteristics into lower dimensions. Similarly to the question source model, in some implementations, the expert model can be a system that enters features of a potential expert into an expert sparse vector. In some implementations, this expert sparse vector can be used as the second input to the distance model. In some implementations, the expert model can transform the expert sparse vector into a lower dimension expert embedding which can be used as the second input to the distance model.

The chatbot system can train the distance model using training items that include a question and an indication of a user who provided an answer identified as the best answer. In some implementations, the training items can also include an identification of the user who asked the question. In some implementations, training items can include a score for the best answer provided corresponding to the training item. Each training item can be used to partially train a distance model, such as a neural network, by converting the question into a first input for the distance model using a question source model and converting factors of the user that provided the best answer into a second input for the distance model using an expert model. The output from the distance model can be compared to a score for the training item and, based on the comparison, parameters or weights for the distance model can be adjusted to make the output of the model more closely match the score.

A "model," as used herein, refers to a construct that is trained using training data to make predictions or provide probabilities for new data items, whether or not the new data items were included in the training data. For example, training data can include a question and an indication of a user who provided an answer identified as the best answer. A new data item can have a question and potential expert features that a model can use to assign a score to the potential expert indicating how well the potential expert is expected to answer the question. Examples of models include: neural networks, support vector machines, decision trees, Parzen windows, Bayes, clustering, reinforcement learning, probability distributions, and others.

Question response systems involve sophisticated semantic and syntactic matching algorithms to match user questions to questions for which one or more answers are available. For example, responding to questions can involve complex characterizations of the question to determine contextual information for the question. In addition, when a question cannot be mapped to a known question/answer pair, the question response system can use complex search and data mining techniques to find an appropriate answer to a user's question. The chatbot system can improve question response systems by finding better sources for answers to questions. The chatbot system can find better sources for answers to questions by using available human users to answer questions and by training a model to determine which users to select to provide these answers.

Figure 1:
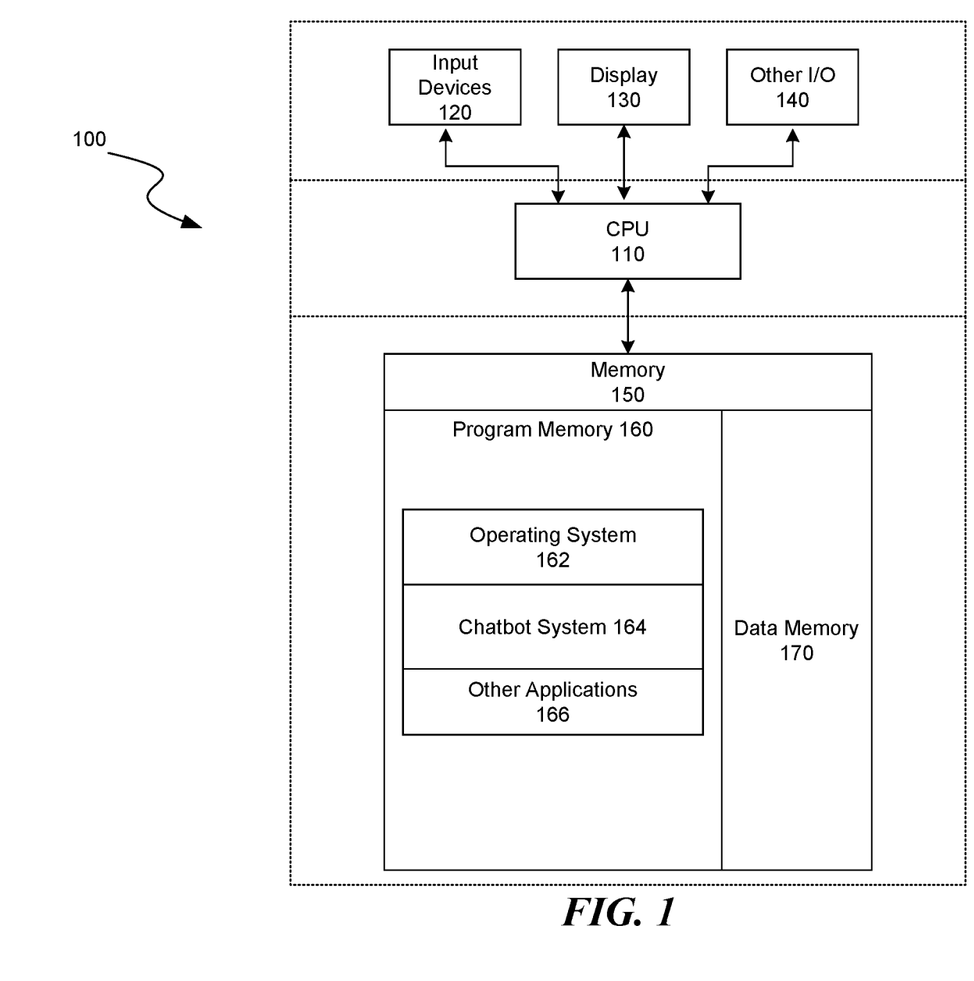
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can apply a chatbot system to select experts to answer user questions using a distance model. Alternatively or in addition, device 100 can use training items comprising a question and who provided good answers to the question to train a distance model. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, chatbot system 164, and other application programs 166. Memory 150 can also include data memory 170 that can include a question/answer knowledge base, user information (e.g. profile and social graph information from a social media website), models such as a question source model, an expert model, and a distance model, algorithms to extract features from questions, algorithms for selecting potential experts for a question, threshold values, training items, questioning/answering interfaces, algorithms for grouping answers, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
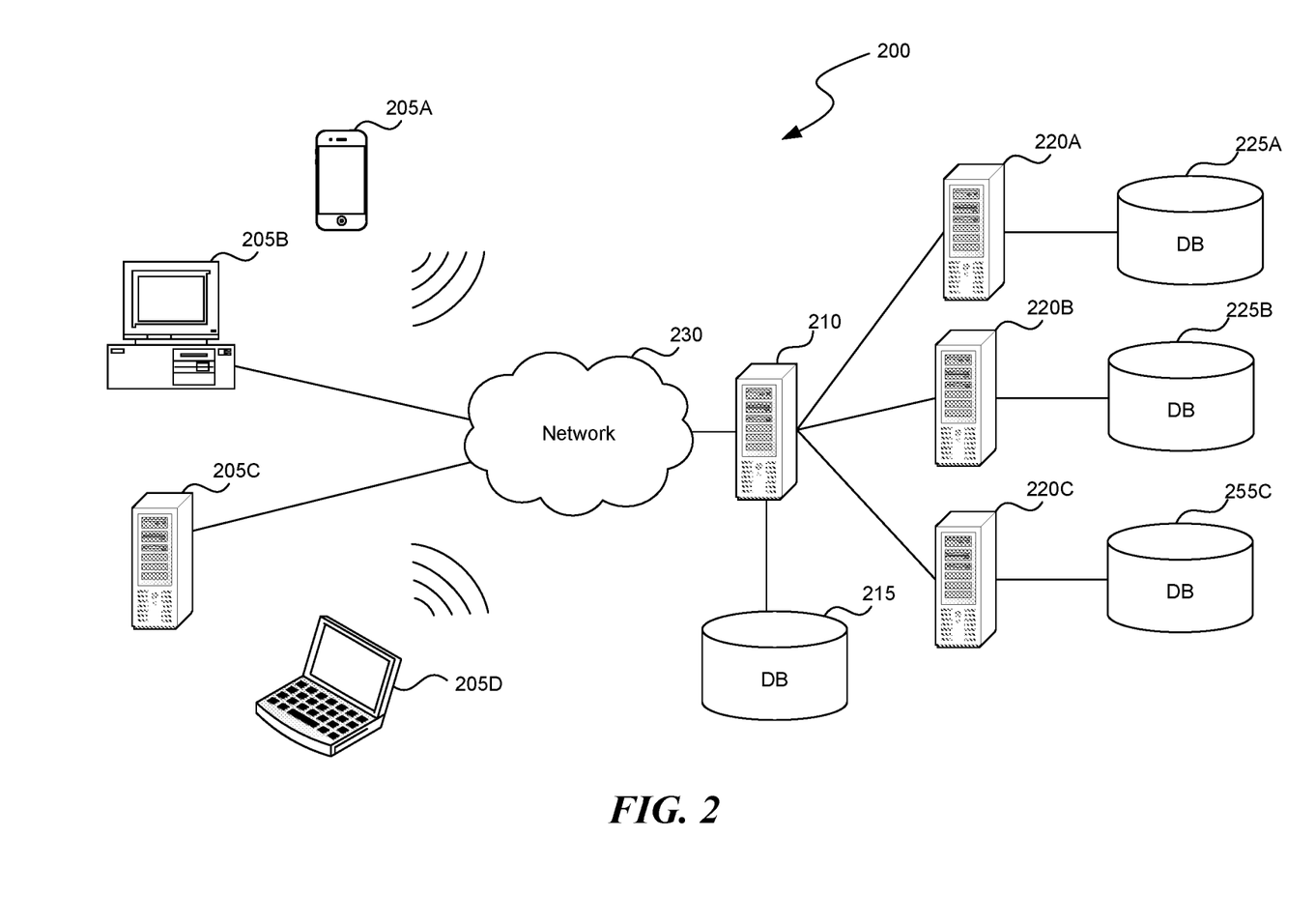
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
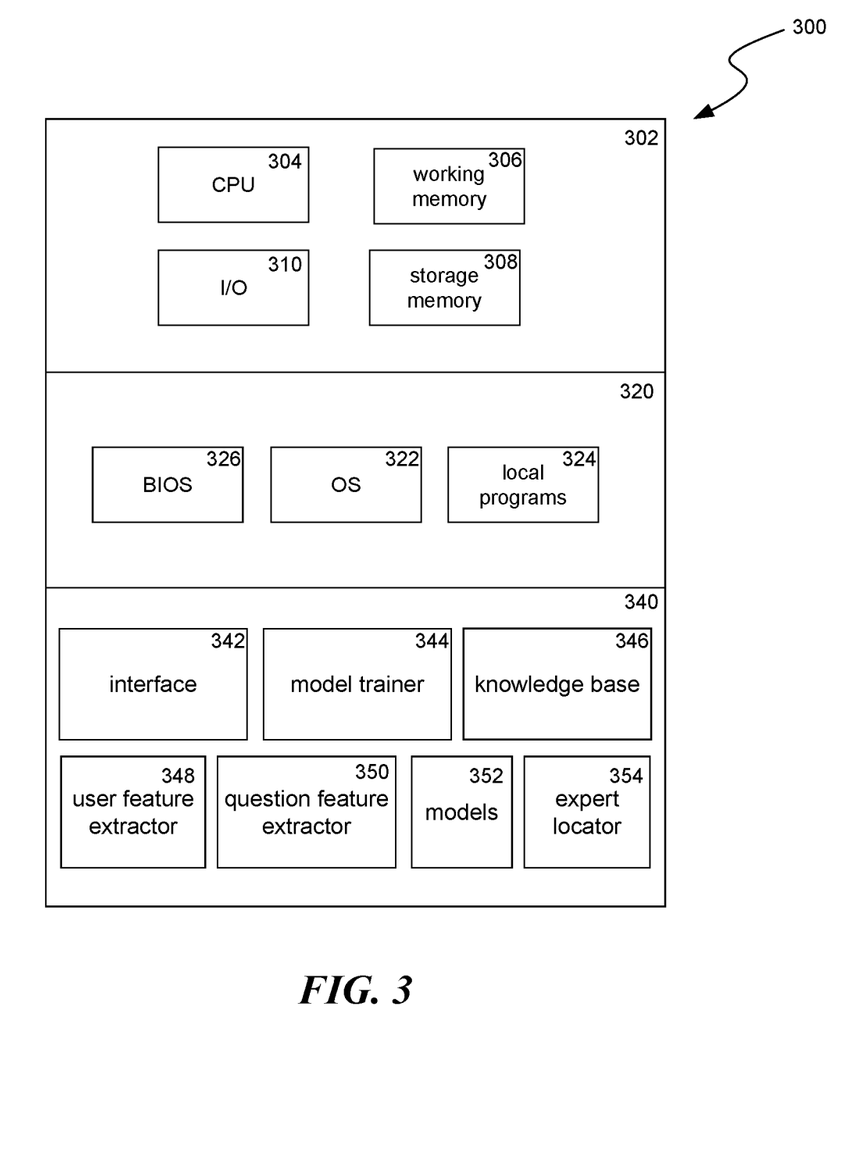
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include: model trainer 344, knowledge base 346, user feature extractor 348, question feature extractor 350, models 352, expert locator 354, and components which can be used for transferring data and controlling the specialized components, such as interface 342. In some implementations, components 300 can be in a computing system that is distributed across multiple computing devices or can include an interface to a server-based application.

Model trainer 344 can be configured to receive multiple training items and a distance model to train, such as through interface 342. For example, the distance model can be a neural network that has not yet been fully trained. In an untrained neural network, weights for links between nodes or for node parameters can be set to random or default values. Each training item can include an indication of a question and an indication of an "expert" who is a user that provided an answer to that question. In some implementations, training items can also include an indication of the user that posed the question. In various implementations, these indications can be links to other data items; a data structure including the question, a data structure representing the asker, or a data structure representing the answerer; characteristics identified for the question, the asker, or the answerer; or any combination thereof. In some implementations, each training item can include a score for the answer provided by the expert or another type of measure or metric for whether the answer provided by the expert was good, bad, mediocre, etc. Model trainer 344 can iterate through the received training items, modifying the received distance model in each iteration to train the distance model.

In each iteration operating using a selected training item of the received training items, model trainer 344 can use user feature extractor 348 to extract features of the expert identified in the selected training item. For example, user features can include: one or more locations associated with the user, gender, age, education, profession or employment, identified friends or classifications of identified friends, types of content the user generally interacts with, types of content the user generally creates, relationship status, family status, purchase history, etc. In some implementations, users can be pre-classified into groups based on extracted features, and this classification can be used as the features extracted by user feature extractor 348.

Model trainer 344 can then use an expert model, of models 352, to generate an expert input for the received distance model. In some implementations, the expert input can be a sparse vector that includes the extracted features. In some implementations, the expert input can be an embedding of the sparse vector.

In each iteration, operating using a selected training item for that iteration, model trainer 344 can use question feature extractor 350 to extract features of the question identified in the selected training item. Model trainer 344 can then use a question source model, of models 352, to generate a question input for the received distance model. In some implementations, the question input can be a sparse vector that includes the extracted features. In some implementations, the question input can be an embedding of the sparse vector. In some implementations, the question input can also be based on features of the user who asked the question. In these implementations, model trainer 344 can include these features in the question input using user feature extractor 348 to extract features of the user who asked the question identified in the selected training item. Model trainer 344 can include these features in the features provided to the source question model, of models 352, to generate the question input. In some implementations, a separate input for the distance model, based on the user who asked the question, can be created, such as a sparse vector or embedding.

Once model trainer 344 has the expert input and the question input, model trainer 344 can apply them to the received distance model to obtain an output score indicating how well the expert identified in the selected training item is expected to provide an answer to the question identified in the selected training item. In some implementations, the distance model can be a neural network with multiple input nodes that receive the question input and the expert input. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, i.e. the output layer, one or more nodes can produce a value that, once the model is trained, can be used as an expert score for the input question/expert. In some implementations where the question input does not include features of the asker of the question, a third input representing the question asker can also be provided to the distance model when computing the output score.

Model trainer 344 can then adjust parameters or weights of the distance model. In some implementations, adjusting the distance model can be based on a comparison of the output score of the distance model and a score or metric for the answer provided by the expert corresponding to the selected training item. Using this comparison, model trainer 344 can adjust model parameters or weights such that the output score more closely matches the score or metric. For example, where the distance model is a neural network, adjusting the model can comprise modifying one or more of the weights applied between nodes in the neural network or modifying parameters of one or more of the functions associated with neural network nodes. These modifications can change the output of the distance model such that the result provided by the output node(s) more closely matches the score for the answer in the training item. For example, where the metric indicates the expert's answer received an average 4/5 stars, but the output score from the distance model was 50/100, the model parameters can be adjusted such that the output score is 55/100. In some implementations, only minor adjustments to the distance model are made for each training item so that no training item overly affects the distance model, allowing for an incremental training of the distance model. Once model trainer 344 has iterated through all of the training items, the distance model can be better able to accurately predict how well a given expert will provide an answer for a given question.

When a user of a chatbot system has a question, the user can pose it to the chatbot system. Part of interface 342 can include a questioning interface that can receive user questions. In some implementations, the questioning interface can be part of a social media website, and can appear as a chat (e.g. messaging or IM) application. In various implementations, the questioning interface can receive user questions in various forms such as by receiving the question in textual form such as in a file including one or more questions, in a network communication, as spoken words, e.g. using a digital personal assistant type interface, or through a video interface. In some implementations, the chatbot system can receive an implied question based on contextual information about a user, even though the user did not explicitly ask a question or asked a different question. For example, the chatbot system can receive position information about a user indicating the user is traveling away from their home. In addition, the chatbot system can have access to data from another system that inferred that the user is traveling to Las Vegas. In response to receiving these data points, the chatbot system can infer the user may want to know the answers to "Are there any hotel deals in Las Vegas right now?" and "Is there a short-cut on the route to Las Vegas from here?" In some implementations, the system can infer questions from how the user interacts with content online, such as on a social media website. For example, a user can provide information by selecting a link or writing a review, such as "this T.V. broke after only two months!" The chatbot system can infer that the user is interested in a new T.V. and pose the question "Which T.V. brand is the most reliable?"

When a question is posed to the chatbot system, the chatbot system can first query knowledge base 346 to determine whether that question, or a similar question, is mapped to an answer in the knowledge base 346 for a user with a context that is within a threshold similarity measure to the user currently asking the question. If so, the knowledge base 346 can return that answer, which can be provided to the user through interface 342. Where such an answer is not already in knowledge base 346, the chatbot system can query one or more other users, identified by expert locator 354 as likely to provide a good answer to the question (e.g. "experts"), for an answer to the question.

Expert locator 354 can be configured to receive a question and select one or more users that are likely to provide a good answer to the question. In various implementations, expert locator 354 can also use information about the context of the question and the person who asked the question to select appropriate experts. Expert locator 354 can use question feature extractor 350 to extract features of a received question. In some implementations, extracting question features can be performed in the same manner as extracting question features, for model trainer 344, of a question from a training item. As discussed above, extracting question features can include analyzing a question to determine keywords, subject, structural representations of portions of a question, selecting a vector-based representation of a question, and a context of the question, such as where it was asked, when it was asked, who asked it, etc. Examples of computing a vector-based representation of a sentence are discussed in greater detail in U.S. patent application Ser. No. 14/861,747, titled Universal Translation, and U.S. patent application Ser. No. 14/878,794, titled Language Independent Representations, each of which is incorporated herein by reference. In some implementations, features of who asked the question can be separately extracted using user feature extractor 348. In some implementations, extracting features of a user who asked a question can be performed in the same manner as extracting features, for model trainer 344, of a user who asked a question included in training items. Expert locator 354 can use a question source model, of models 352, to transform a question into a question input for a distance model, of models 352, where the distance model was trained as discussed above using model trainer 344.

Expert locator 354 can also obtain a set of potential experts to answer the question. In some implementations potential experts can be selected from users of a social media website. In some implementations potential experts can initially be identified based on characteristics matching characteristics of the question or person asking the question, such as age, location, a category that both the potential expert and person asking the question are assigned, or a topic of the question matching an area of expertise identified for potential experts. Expert locator 354 can then iterate through these potential experts to determine which one or ones are likely to provide a good answer to the question.

In each iteration, expert locator 354 can extract features of the potential expert using user feature extractor 348. In some implementations, extracting expert features can be performed in the same manner as extracting user features, for model trainer 344, of users who provided an answer to a question in a training item. The extracted features can be formatted using an expert model, of models 352, into an expert input for the distance model, of models 352.

Expert locator 354 can then use the distance model, of models 352, to compute a distance score for each potential user, where the distance score indicates how well the potential expert is expected to answer to the question. In some implementations, expert locator 354 can use the distance model by supplying it with the question input and user input described above. In some implementations, the question input can be based solely on the question. In some implementations, the question input can be based on the question and characteristics of the user who asked the question. In some implementations, instead of having the question input being based on characteristics of the user who asked the question, a third input representing characteristics of the user can be provided to the distance model.

Expert locator 354 can then sort the experts based on their distance scores. In some implementations, expert locator 354 can adjust the distance score for individual potential experts based on other factors for that potential expert, such as how many answers this potential expert has provided before, an amount of time it usually takes this potential expert to answer questions, previous scores provided for answers provided by this potential expert, etc. Expert locator 354 can then select one or more of the experts based on their distance score. In various implementations, selecting experts can be performed by: selecting all experts with a distance score above a threshold or selecting a specified number of top scoring experts. In some implementations, the number of experts selected can vary depending on features of the experts. For example, where the experts with a distance score above a threshold have historically not provided responses within a threshold amount of time, more experts can be selected. Conversely, where the top scoring experts are expected to respond quickly, only a few experts may be selected. As another example, where not enough of the potential expert distance scores are above the threshold, a greater number of experts can be selected so that more potential answers can be used. Once the expert locator 354 has selected one or more experts, the chatbot system can present the question to the selected experts through interface 342. In some implementations, the chatbot system can present the question to a selected expert in the form of an instant message through a social media website.

One or more of the selected experts can provide answers to the question, e.g. through interface 342. In some implementations, answers can be provided either as links to social media entities, or the chatbot system can interpret answers as corresponding to a particular social media entity. For example, the answer "my favorite movie is Men in Black" could be converted to an identification of a social media entity (e.g. page, fan group, user, identifier) for the Men in Black movie. As these answers are received, they can be distilled and grouped according to the similarity. For example, the question associated with a particular location can be "what is the best coffee shop in this neighborhood?" The answers could be "I like Norm's over on 3rd," "Sally's Famous Coffee is the best," a link to the website for Norm's Coffee Shop, "You can't get a better cup of coffee than at Norm's Coffee Shop," and "Rapid Coffee on 5th is superb." These questions can be distilled into three answers for "Norm's Coffee Shop," one vote for "Sally's Famous Coffee," and one vote for "Rapid Coffee." Because Norm's Coffee Shop received the most answer votes, this can be selected as the best answer. The chatbot system can then add a question answer pair for: the best coffee shop near the specified location/Norm's Coffee Shop, to the knowledge base 346. As answers are provided, they can be scored explicitly by users, based on user intercalations with the answer, or by determining which answers were the most common. The chatbot system can select a best answer based on one or more of these criteria.

Once the chatbot system selects an answer to the received question, whether the answer was provided from an expert or the knowledge base 346, the chatbot system can use part of interface 342 that includes an answering interface to provide the answer to the user. In some implementations, the answering interface can be the same interface as the questioning interface. For example, the questioning and answering interfaces can be an imitation of a chat service that is part of a social media system, where, instead of chatting with another person, the chat service interfaces with a chatbot application.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
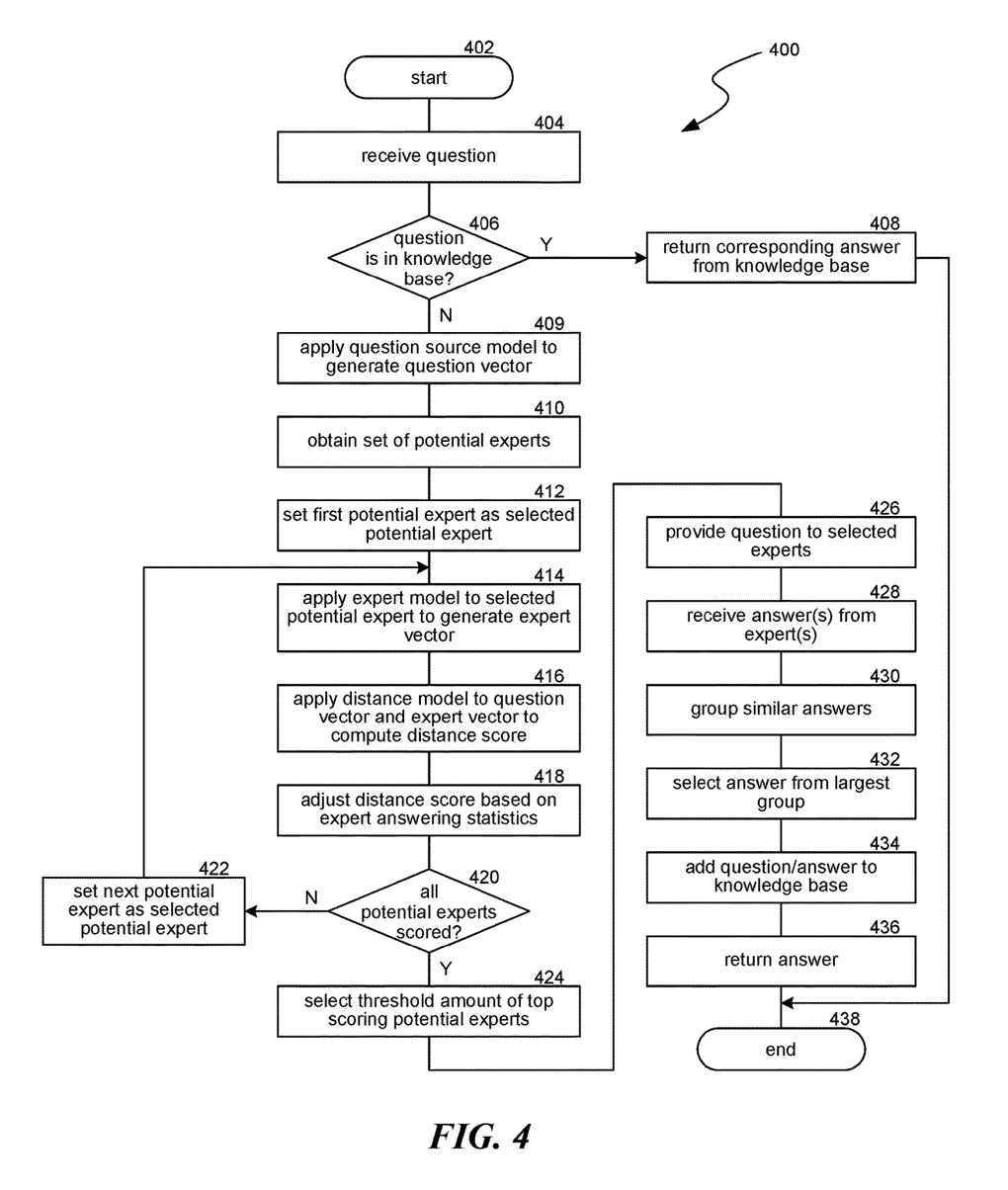
FIG. 4 is a flow diagram illustrating a process used in some implementations for responding to user questions.

FIG. 4 is a flow diagram illustrating a process 400 used in some implementations for responding to user questions. Process 400 begins at block 402 and continues to block 404. At block 404, process 400 can receive a question. In some implementations, the received question can be associated with a user who asked the question. In some implementations, the question can be received through a chat interface in a social media system. In some implementations, the question can be received through another interface such as an email system, a voice recognition system, or a submitted file. In some implementations, the question can be inferred from content provided by a user or a user's actions. For example, based on a user's interactions with a social media website, the chatbot system can determine that the user recently had a baby and is currently shopping for diapers. From this information, the chatbot system can infer the question "which is the best brand of diaper."

At block 406, process 400 can determine if the question received at block 404 is already in a knowledge base. In some implementations, comparing a question to questions in a knowledge base can include determining an abstracted version of the question. For example, the question can be reduced to a set of keywords or to a semantic representation such as a vector in a vector space. As a more specific example, the question "what is the best Italian restaurant in San Francisco?" Could be reduced into a question type of a recommendation, a question subject for restaurant and sub-subject Italian, and a location of San Francisco. The knowledge base can be structured to retrieve answers matching this type of question categorization. In some implementations, question and answer mappings in the knowledge base can be associated with contextual information of the question such as a timeframe, location, or age appropriateness.

For example, a question could be mapped into the database of "what is the best movie playing?" Answers to this question in the knowledge base can be associated with a timeframe indicating when the answer expires, e.g. when the movie identified is no longer playing. If the question received at block 404 is mapped to an answer that is appropriate for the person who asked the question in the context associated with the question, process 400 can proceed to block 408. If no such answer is in the knowledge base, process 400 can continue to block 409. At block 408, process 400 can return the answer identified in the knowledge base and process 400 continues to block 438, where it ends.

At block 409, process 400 can apply a question source model to the question received at block 404 to generate a question vector. In some implementations, the question source model can be an algorithm that identifies features of the question and enters them into a sparse vector. For example, process 400 can extract features of the question and use natural language processing to determine a structure, such as a dependency tree, representing the question. Other features of the question can also be extracted such as its length, keywords used, identified subject, where the question is posted on a social media website, what other users have interacted with (e.g. liked or shared) the question, how other users have interacted with the question, etc. In some implementations, the question vector can also include features extracted for the person who asked the question. For example, such user characteristics can include: a user's age, gender, educational status, employment, location, income, purchase history, types of content the user has interacted with, friends the user has, religion, political affiliations, types of content the user typically posts, relationship status, etc. In some implementations, the question source model can also include a component to convert the sparse vector into a lower dimension embedding, as discussed above. In some implementations, instead of including the features of the user who asked a question in the question vector, a separate asker vector can be computed, e.g. by providing the extracted user features to an asker model. As used herein, use of a "question vector" can include use of a vector including only features of the question, features of the question and the user who asked the question, or use of two vectors including a vector created using features of the question and a vector created using characteristics of the asker of the question.

At block 410, process 400 can obtain an identification of one or more potential experts to answer the question received at block 404. In some implementations, potential experts can be the users of a social media website. In some implementations, potential experts can be filtered using minimum qualifications. For example, potential experts can be identified as having an overall area of expertise and the question received at block 404 can be categorized into one or more of these areas. In some implementations, users can be separated into one or more categories based on a similarity of characteristics among the users in each category, and one or more of the users in these categories can be selected as potential experts. In some implementations, potential experts can be filtered based on the question received at block 404. For example keywords or general subjects can be identified for the received question which can be mapped to user characteristics for potential experts. As a more specific example, a question can be associated with a particular location, age range, or gender, and potential experts can be selected that are associated with that particular location, are in that age range, or have that gender.

At block 412, process 400 can set a first of the potential experts selected at block 410 as a selected potential expert. The selected potential expert can be operated on by the loop between the blocks 414 and 422.

At block 414, process 400 can apply an expert model to the selected potential expert to generate an expert vector. In some implementations, the expert model can be an algorithm that identifies characteristics associated with the selected potential expert and enters them into a sparse vector. For example, such characteristics can include a user's age, gender, educational status, employment, location, income, purchase history, types of content the user has interacted with, friends the user has, religion, political affiliations, types of content the user typically posts, relationship status, how often the user provides answers to questions, scores for answers provided by the user generally or in various categories (e.g. based on user scores or number of likes or shares of an answer), etc. In some implementations, the expert model can also include a component to convert the sparse vector into a lower dimension embedding, as discussed above.

At block 416, process 400 can apply a distance model to the question vector and the expert vector to compute a distance score indicating an expectation of how good an answer provided by the selected potential expert will be for the question received at block 404. For example, where the distance model is a neural network, the question vector and the expert vector can be provided as input to each function corresponding to nodes at an input layer of the neural network. The results of these functions can be weighted using a weighting factor corresponding to the link between each input node and each node at the next level of the neural network. Results are successively generated by the nodes at each level and weighted results are passed to a next level until a node at an output level receives values and applies them to a function corresponding to the output node to compute the distance score. In some implementations, the distance model can be trained, e.g. the weights between nodes set and/or parameters for the functions set, using process 500 described below.

At block 418, process 400 can adjust the distance score for the selected potential expert based on statistics associated with the selected potential expert. In various implementations, the statistics associated with the selected potential expert can include one or more of: an amount of time the selected potential expert generally takes to provide an answer, an amount or frequency of answers provided by the potential expert, or a typical score for answers provided by the potential expert. In various implementations, a typical score for answers provided by the potential expert can be computed based on explicit scores provided by users, such as through a star rating system or based on other users' responses to the answer, such as whether the person who asked the question liked or shared the answer or how many other users liked or shared the answer. The typical score can be an average for the answers provided by the selected potential expert or an average weighed by how many users view each of the answers provided by the selected potential expert.

At block 420, process 400 can determine whether all the potential experts selected at block 410 have been evaluated by the loop between blocks 414-422, if not process 400 continues to block 422; if so, process 400 continues to block 412. At block 422, process 400 can set the next potential expert, of the potential experts selected at block 410, as the selected potential expert to be operated on in the loop between blocks 414-422 to generate another distance score.

At block 424, process 400 can select a threshold amount of experts from the top scoring potential experts. In some implementations, selecting experts can include selecting all the experts that have a distance score above a threshold. In some implementations, process 400 can select a specified number of top scoring experts. In some implementations, selecting experts can include selecting the top scoring experts until a threshold weight of scores have been selected. As a first example, where the top two distance scores are both 100% only the corresponding two experts can be selected, as the combined weight of these high scores passes a threshold. As a second example, where the top five scores are 60%, 40%, 35%, 30%, and 10%, the experts corresponding to the top four scores can be selected, as it takes a greater number for the combined weight of these lower scores to pass the threshold. In some implementations, the number of experts selected can be based on a determination, based on past questions sent to these experts or to experts generally, of how many experts need to be queried to get a good result within a threshold amount of time.

At block 426, process 400 can provide the question received at block 404 to the experts selected at block 424. In some implementations, questions can be provided to experts through an instant messaging portion of a social media system. In some implementations, questions can be provided to experts through other communications such as email or an interface such as a webpage designed for experts to provide answers to questions. At block 428, process 400 can receive one or more answers from the selected experts. In some implementations, experts can provide answers using the components which provided them the questions, such as by responding to an instant message or email. In some implementations, answers can be provided either as links to social media entities or the chatbot system can interpret answers as corresponding to one or more social media entities.

At block 430, process 400 can group answers from the experts that are similar. Where answers are, or have been interpreted to correspond to, social media entities, answers that identify the same or related social media entity can be grouped. In some implementations, answers can be grouped based on keyword, identified subject(s), or by mapping the answers into a vector space and determining clusters of vectors. In some implementations, at block 430, process 400 can also remove personal information from expert answers. For example, information associated with a particular user, or that is not available publicly, can be removed from hand answer. In some implementations where answers correspond to one or more social entities, entities that are not publicly viewable can be removed.

At block 432, process 400 can select an answer that corresponds to the largest grouping determined at block 430. In some implementations, process 400 can select multiple answers, e.g., from each grouping that has more than a threshold number of answers. At block 434, process 400 can add the answer corresponding to the largest grouping to the knowledge base, mapped to the question received at block 404. In some implementations, characteristics of the question or of the expert or experts that provided the answer can also be associated with the mapping in the knowledge base. For example, the question and answer pair can be associated with a location, a timeframe, or characteristics of the user who asked the question or of the user who provided the answer, such as age, gender, occupation, etc. These additional characteristics can be used, e.g. at block 406, when a new question is asked and process 400 is used to determine if a suitable answer is already known in the database. For example, the question "what should I get my boss for Christmas?" can be associated with a characteristic of an occupation of the person asking the question. Where multiple answers were selected at block 432, each can be associated with a different set of characteristics for the expert or the answer, such as a location the answer was provided for or an age of the person answering the question. For example, where a question is "what type of music is the best" multiple answers can be provided corresponding to both "country" and "rap." Each of these answers can be included in the knowledge base associated with a location identifier that was common across the experts that provided the corresponding answer.

At block 436, the best answer selected for the person that asked the question can be provide to that person. In some implementations, the answer can be provided through a similar interface from which the question was asked. For example, where the question was in an instant message, a responding instant message can be provided. In some implementations, the answer can be in the form of a link to an entity in a social media system. Process 400 then continues to block 438, where it ends.

Figure 5:
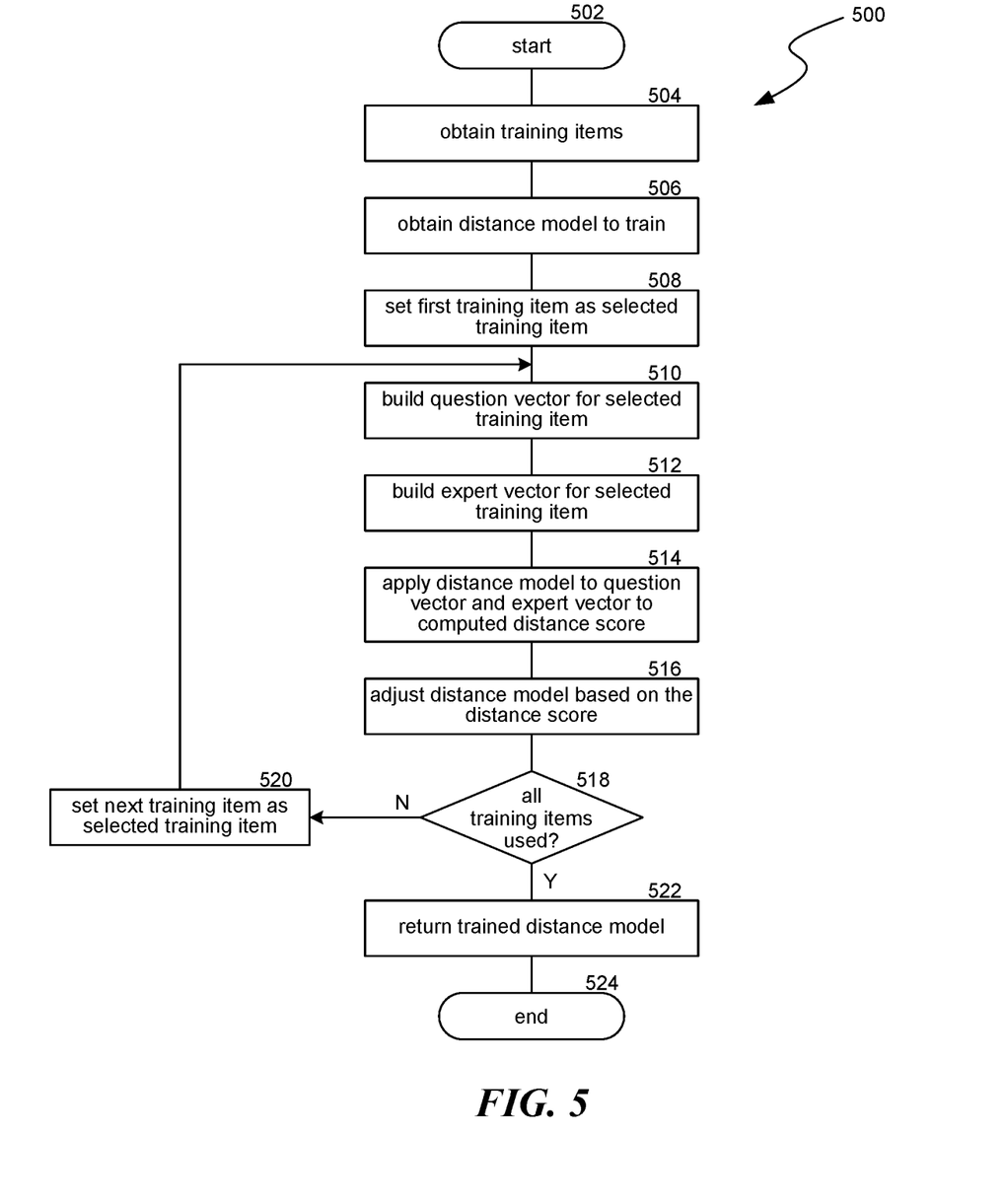
FIG. 5 is a flow diagram illustrating a process used in some implementations for training a distance model to identify experts to answer a question.

FIG. 5 is a flow diagram illustrating a process 500 used in some implementations for training a distance model to identify experts to answer a question. Process 500 begins at block 502 and continues to block 504. At block 504, process 500 can obtain a set of training items, each training item including an indication of a question and an indication of a user who provided an answer to the question (e.g. an "expert"). In various implementations, each training item can include one or more of: an indication of a person who asked the question or a measure of how good the answer, provided by the expert, was. In various implementations, the measure can be based on scores provided by users for the answer, a number of people who liked the answer, or a number of shares of the answer. In some implementations, the set of training items can include items corresponding to answers that received a comparatively high score and training items corresponding to answers that received a comparatively low score. In some implementations, the set of training items can include indications of questions and indications of the expert who provided the best answer to the question.

At block 506, process 500 can obtain a distance model to train. In some implementations, the distance model can be a machine learning model, such as a neural network. As discussed above, a neural network can be a system with one or more input nodes, a series of one or more levels of intermediate nodes, and one or more output nodes. Data can be provided to functions corresponding to each of the input nodes, and result of the functions can propagate up the neural network until a result is computed by the output nodes.

At block 508, process 500 can set a first training item, of the training items received at block 504, as a selected training item. Process 500 can then operate on the selected training item in the loop between blocks 510 and 520. At block 510, process 500 can build a question vector for the selected training item. In some implementations, the question vector can be a sparse vector that includes features extracted from the question indicated in the selected training item, such as keywords, categories, subjects, question types, identified social network entities, or other representations of the question. In some implementations, the extracted features can also include features of the person who asked the question, such as their age, gender, educational status, occupation, etc. In some implementations, the question vector can be an embedding based on the extracted features.

In some limitations where the distance model trained by process 500 is used by process 400 to respond to questions, building a question vector can be performed in the same manner as it is performed at block 409.

At block 512, process 500 can build an expert vector for the expert identified in the selected training item. In some implementations, the expert vector can be a sparse vector that includes features extracted for the expert indicated in the selected training item, such as age, gender, educational status, occupation, rate of providing answers, answer scores, etc. In some implementations, the expert vector can be an embedding based on the extracted features. In some limitations where the distance model trained by process 500 is used to respond to questions by process 400, building an expert vector can be performed in the same manner as it is performed at block 414.

At block 514, process 500 can apply the distance model obtained at block 506 to the question vector built at block 510 and the expert vector built at block 512. Where the distance model is a neural network, for example, applying the distance model to these vectors can include providing a copy of each of the question vector and expert vector to a function corresponding to each of the input nodes of the neural network, and having results propagate up the neural network until a distance score is provided by a function corresponding to an output node of the neural network.

At block 516, process 500 can adjust parameters or weights of the distance model based on the computed distance score. Adjusting the parameters or weights of the distance model can be based on a comparison of the distance score computed at block 514 to the measure of how good the answer, provided by the expert identified in the selected training item, was. For example, this adjustment can include modifying weights applied to the output of one or more functions corresponding to a node in the neural network prior to passing that result to a function corresponding to a node at a next level of the neural network.

At block 518, process 500 can determine whether all of the training items obtained at block 504 have been operated on by the loop between blocks 510 and 520. If so, process 500 continues to block 522; if not, process 500 continues to block 520. At block 520, process 500 can set the next training item of the training items obtained at block 504 as the selected training item, to be operated on by the loop between blocks 510 and 520. At block 522, the distance model has been trained with all the obtained training items to identify how well a potential expert is expected to answer a given question, and thus process 500 can return the trained distance model. Process 500 then continues to block 524, where it ends.

Figure 6:
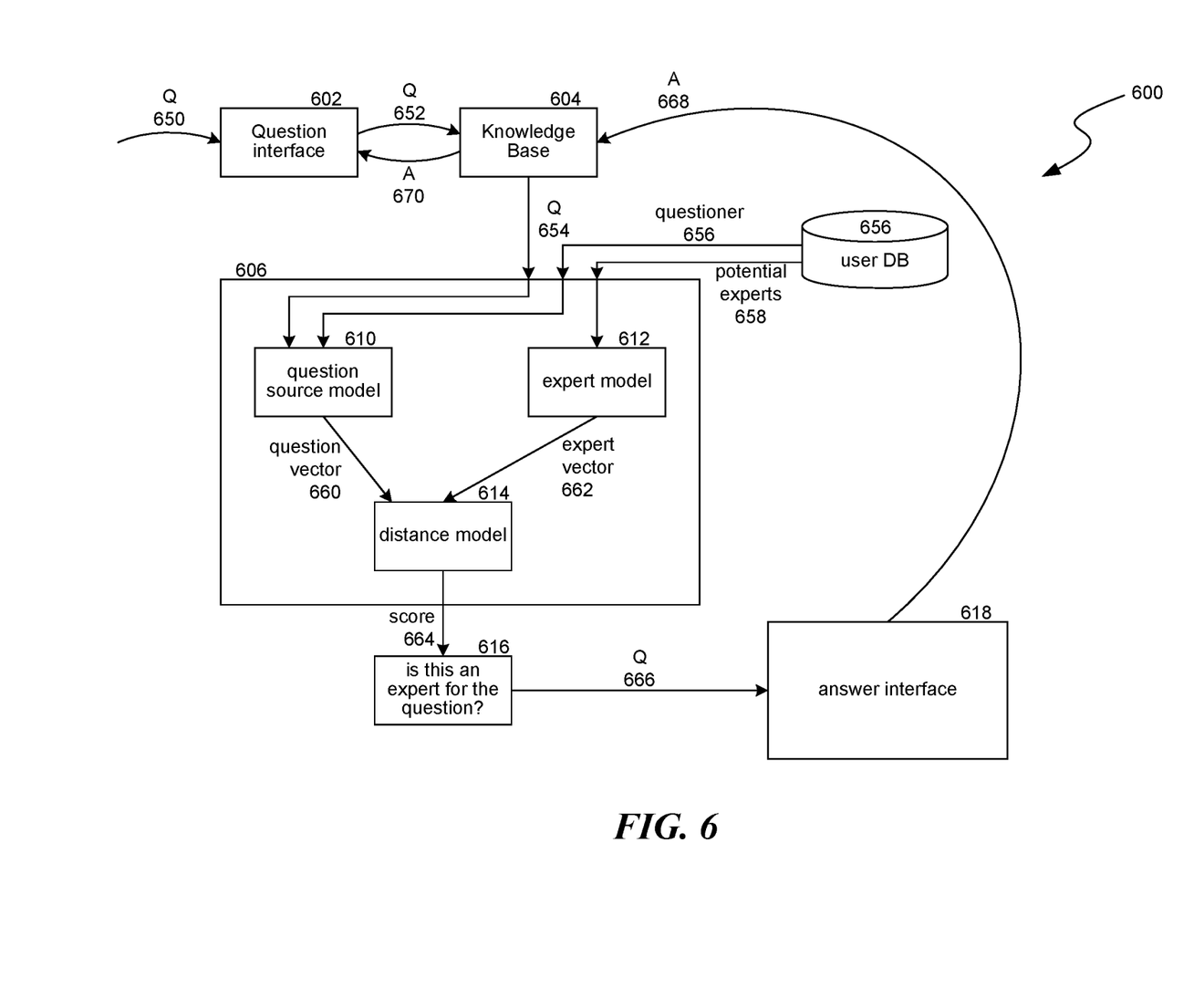
FIG. 6 is an example illustrating an implementation of a chatbot system.

FIG. 6 is an example 600 illustrating an implementation of a chatbot system. Example 600 includes a question interface 602; a knowledge base 604; a user database 608; models 606 that include a question source model 610, an expert model 612, and a distance model 614; an expert selector 616; and an answer interface 618. In example 600, question interface 602 is an input portion of a messenger component of a social media website for users to ask questions. In example 600, user database 608 includes identifications of users of the social media website with characteristics of the users. In example 600, answer interface 618 is another input portion of the messenger component of the social media website for users to provide answers to questions.

Example 600 begins at 650 with a user providing a question through question interface 602. At 652, the questions is provided to knowledge base 604 to determine whether a sufficiently similar question is already mapped to an answer in the knowledge base 604. In example 600, no such question is already mapped to an answer in the knowledge base 604.

Next, at 654 the question is provided to question source model 610 of models 606. In addition, at 656, features of the user who asked the question are provided from user database 608 to the question source model 610. Question source model 610 enters the question features and the user features into a sparse vector and generates an embedding vector representing the question and the questioner. At 658, potential experts matching the question are selected and features of each are provided to expert model 612. Expert model 612 then enters the potential expert features into a sparse vector and generates an embedding for each potential expert.

At 660, the question vector is provided to distance model 614. At 662, each of the expert vectors can be provided to the distance model 614. The distance model performs a comparison between one of the expert vectors and the question vector to produce a corresponding score at 664 for each of the expert vectors.

At 664, each of the scores provided by the distance model 614 for each potential expert can be compared to a threshold to determine if the corresponding expert should be selected to provide an answer. In example 600, the 20 highest scoring expert are selected to provide an answer. At 666, the question is provided, through answer interface 618, to the selected 20 experts. In example 600, the question is provided through the portion of the messenger component of the social media website to the selected experts.

At 668, answers from the selected experts can be grouped and the most common answer is provided to the knowledge base 604. The most common answer is then mapped to the question in knowledge base 604. The most common answer is then provided, at 670, through the question interface 602, to the user that asked the question.

In particular embodiments, training elements and other data, e.g. data from an online social network, may be associated with privacy settings. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, a social-networking system may send a request to the data store for the object. The request may identify the user associated with the request and may only be sent to the user if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. Although this disclosure describes enforcing privacy settings in a particular manner, this disclosure contemplates enforcing privacy settings in any suitable manner.

Some embodiments described herein make use of data or metrics that may include information voluntarily provided by one or more users. In such embodiments, data privacy may be protected in a number of ways.

For example, the user may be required to, or may voluntarily, opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for providing an answer to a question, the method comprising:
   receiving the question;
   determining that a previous question that matches the received question has not been mapped to a previous answer in a knowledge base;
   extracting one or more features of the question;
   generate, by a trained question source model, a question vector for the question based on the one or more features of the question;

identifying one or more potential experts based on a match between the one or more features of the question and each of the one or more potential experts;
computing a distance score for each selected potential expert of the one or more potential experts by:
  obtaining features of the selected potential expert;
  using a trained expert model to generate an expert vector based on the features of the selected potential expert; and
  computing the distance score for the selected potential expert by applying a trained distance model to the question vector and the expert vector to produce the distance score for the selected potential expert, wherein the distance model is trained based on multiple training items, each training item comprising a training question, wherein the expert model, the distance model, and the question source model each comprise one or more of a neural network, a support vector machine, or a decision tree;
selecting, from among the one or more potential experts, based on the distance scores associated with the one or more potential experts, one or more experts;
providing the question to the selected one or more experts;
receiving one or more answers from the one or more experts;
selecting an answer of the received one or more answers; and
providing the selected answer to a user that asked the question.

2. The method of claim 1, wherein the vectors are in a vector space, wherein the one or more features of the question are selected from a plurality of features, the plurality of features comprising:
  a dependency tree representing the question;
  a length of the question;
  one or more keywords used in the question;
  one or more subjects identified for the question;
  how users of a social media website have interacted with the question;
  or any combination thereof.

3. The method of claim 1, wherein the distance score indicates an expected value of an answer to the question that can be provided by the selected potential expert.

4. The method of claim 1, wherein the received question is associated with a user who asked the question, and wherein the one or more features of the question comprise one or more of: an age, a gender, an educational status, an occupation, one or more locations, a religion, a political affiliation, a relationship status, a classification of the user, or any combination thereof.

5. The method of claim 1, wherein the features of the selected potential expert comprise one or more of: age; gender; educational status, a score for answers the selected potential expert has previously provided; one or more locations associated with the selected potential expert; types of content the selected potential expert generally interacts with; types of content the selected potential expert generally creates; purchase history; a classification of the selected potential expert, or any combination thereof, wherein the expert vector comprises an embedding having a number of dimensions less than a number of the features of the selected potential expert.

6. The method of claim 1, wherein the distance model is trained by performing operations comprising:
  obtaining the multiple training items, each training item comprising: the training question, an identification of a user who asked the training question, an identification of a user who provided an answer to the training question, and a score for the answer to the training question;
  obtaining the distance model; and
  training the distance model by iterating through each of the multiple training items, wherein a selected training item is operated on in each iteration and each iteration comprises:
    building the question vector based on features of the training question in the selected training item and features of the user who asked the question identified in the selected training item;
    building the expert vector based on features of the user who provided an answer to the training question identified in the training item;
    applying the distance model to the question vector and the expert vector to compute a training distance score; and
    adjusting weights or parameters of the distance model based on a comparison of the training distance score and the score for the answer to the training question in the selected training item.

7. The method of claim 1, wherein obtaining the distance score for each selected potential expert, of the one or more potential experts, is performed by modifying the distance score computed by the distance model based on one or more of:
  an amount of time the selected potential expert generally takes to provide an answer,
  an amount or frequency of answers provided by the selected potential expert, a typical score for answers provided by the selected potential expert, or
  any combination thereof.

8. The method of claim 1, wherein selecting the one or more experts is performed by selecting a specified number of the one or more potential experts that have the highest distance scores.

9. The method of claim 1, wherein selecting the one or more experts is performed by selecting the potential experts that have a distance score above a threshold score.

10. The method of claim 1, further comprising:
  mapping the received one or more answers into a respective answer vector in a vector space;
  grouping the answer vectors into at least two groups of vectors based on similarity measures between the answers; and
  selecting an answer of the received one or more answers based on the corresponding answer vector being in the largest of the at least two groups of vectors.

11. The method of claim 1, further comprising:
  grouping the received one or more answers into at least two groups by assigning entities of a social media website to each answer and grouping answers that are associated with the same social media entities; and
  selecting an answer of the received one or more answers based on it being in the largest of the at least two groups.

12. The method of claim 1, further comprising removing information identified as personal information from the received one or more answers.

13. The method of claim 1, wherein the question is a first question and wherein the method further comprises:
  adding the selected answer to the knowledge base;
  receiving a second question from a second user;
  determining that the second question is similar to the first question;

retrieving the selected answer from the knowledge base; and providing the selected answer to the second user.

14. A computer-readable storage medium storing instructions that, when executed by a computing system, cause the computing system to perform operations for selecting experts to answer a question, the operations comprising:

receiving the question;

extracting one or more features of the question;

using a trained question source model to generate a question vector for the question based on the one or more features of the question;

selecting one or more potential experts;

obtaining a distance score for each selected potential expert of the one or more potential experts by:

obtaining features of the selected potential expert;

using a trained expert model to generate an expert vector based on the features of the selected potential expert; and computing the distance score for the selected potential expert by applying a distance model to the question vector and the expert vector to produce the distance score for the selected potential expert, the distance model trained based on multiple training items, each training item comprising a training question, wherein the expert model, the distance model, and the question source model each comprise one or more of a neural network, a support vector machine, or a decision tree;

selecting, from among the one or more potential experts, based on the distance scores associated with the one or more potential experts, one or more experts to answer the question; and receiving one or more answers from the one or more experts selected to answer the question.

15. The computer-readable storage medium of claim 14, wherein the vectors are in a vector space, wherein the features of the selected potential expert comprise one or more of:

a score for answers the selected potential expert has previously provided; types of content the selected potential expert generally interacts with; types of content the selected potential expert generally creates; or any combination thereof.

16. The computer-readable storage medium of claim 14, wherein obtaining the distance score for each selected potential expert, of the one or more potential experts, is performed by modifying the distance score computed by the distance model based on one or more of:

an amount of time the selected potential expert generally takes to provide an answer, an amount or frequency of answers provided by the selected potential expert, a typical score for answers provided by the selected potential expert, or any combination thereof.

17. The computer-readable storage medium of claim 14, wherein the received question is associated with a user who asked the question; and wherein the one or more features of the question comprise one or more of: an age, an educational status, an occupation, one or more locations, or any combination thereof.

18. A system for identifying experts to answer a question, the system comprising:

a memory;

one or more processors;

an interface configured to receive the question and representations of one or more potential experts;

a question feature extractor configured to extract one or more features of the question;

a question source model trained to generate a question vector based on the one or more features of the question; and an expert locator configured to:

select one or more potential experts;

obtain a distance score for each selected potential expert of the one or more potential experts by:

using a user feature extractor to extract features of the selected potential expert;

using a trained expert model to generate an expert vector based on the features of the selected potential expert; and computing the distance score for the selected potential expert by applying a trained distance model to the question vector and the expert vector to produce the distance score for the selected potential expert, wherein the distance model is trained based on multiple training items, wherein each training item comprises a training question, wherein the expert model, the distance model, and the question source model each comprise one or more of a neural network, a support vector machine, or a decision tree;

selecting, from among the one or more potential experts, based on the distance scores associated with the one or more potential experts, one or more experts to answer the question; and receiving one or more answers from the one or more experts selected to answer the question.

19. The system of claim 18, wherein the vectors are in a vector space, wherein the features of the selected potential expert comprise one or more of: a score for answers the selected potential expert has previously provided; types of content the selected potential expert generally interacts with; types of content the selected potential expert generally creates; or any combination thereof.

20. The system of claim 18, wherein the expert model, the distance model, and the question source model each comprise one or more of a neural network, a support vector machine, or a decision tree, wherein obtaining the distance score for each selected potential expert, of the one or more potential experts, is performed by modifying the distance score computed by the distance model based on one or more of:

an amount of time the selected potential expert generally takes to provide an answer, an amount or frequency of answers provided by the selected potential expert, a typical score for answers provided by the selected potential expert, or any combination thereof.

* * * * *